United States Patent Office 3,264,823
Patented August 9, 1966

---

3,264,823
ROTARY FLUID DELIVERING MACHINE
René Linder, Via Baranzate 49D, Novate Milanese, Italy
Filed Oct. 23, 1964, Ser. No. 405,958
Claims priority, application Switzerland, Oct. 25, 1963,
13,065/63
2 Claims. (Cl. 60—39.38)

My invention has for its object an engine including a compressor, at least one combustion chamber and one turbine, the compressor being of the volumetric type and being provided with a rotary piston adapted to move inside a fluidtight casing.

Engines provided with a rotary piston are well-known in the art and in particular the Wankel engines, in which the piston moves inside the fluidtight input chamber in which the gas is admitted and compressed. In such engines, the explosion chambers are generally located inside the actual fluidtight casing. The fluidtightness is ensured by steel blades the operation of which is intricate. The cooling of such engines is a difficult matter and their balancing is also a delicate matter.

Various types of volumetric machines are also known, of which the features are however limited by the problems of fluidtightness.

The output of said machines is generally not suitable at the pressure obtained and their use for fluids of a reduced specific weight does not provide a sufficient efficiency.

Lastly, turbine engines are being now perfected and operate generally with a centrifugal axial or radial compressor. The compressed air is fed into a combustion chamber into which the fuel is injected. The mixture of air and fuel is ignited by means of a special ignition plug and the large increase in volume of said gases when ignited projects them onto the successive stages of the turbine. The propelling stages are generally independent of a first stage which drives the compressor. Since the gases passing out of such turbines are too hot for them to be allowed to be exhausted freely, out of an automobile for instance, they are often directed onto a heat exchanger which heats the air sucked in by the compressor. The increase in temperature of said sucked-in air reduces however the rate of compression.

My invention has now for its object an engine avoiding such drawbacks and it includes a compressor, at least one combustion chamber and one turbine, wherein the compressor is of the volumetric type and is provided with a rotary piston adapted to move inside a fluidtight casing, which piston is constituted by an elongated body of which the ends are semicylindrical in shape and which is provided with a cylindrical toothed recess extending perpendicularly to the rotary plane of the piston inside the central section of the latter. The inner lateral walls of said casing are furthermore cut so as to form three arcuate recesses of a diameter corresponding to that of said semicylindrical sections of the piston body, said arcuate recesses being arranged symmetrically at 120° round the central section of the casing in registry with each other and having a size such that the spacing between the ridge connecting the cylinders defined by two adjacent recesses and the medial line of the recess adjacent the first mentioned recesses may be substantially equal to the length of the piston. A shaft driving said piston projects into the central section of said casing and carries a toothed wheel meshing with the teeth formed in the cylindrical recess of the piston.

According to my invention, each of the recesses is connected with the adjacent recess through an intermediate cylindrical surface of which the axis is stationary while the above-mentioned wheel is eccentric with reference to the axis of said shaft by an amount such that through its rotation, it controls the shifting of the piston inside the casing while urging it constantly in contacting relationship with said cylindrical surfaces so as to define between said piston and said recesses three radial chambers and furthermore said piston is driven into an orbital movement having an apogee and a perigee with reference to the geometrical axis of the casing.

I have illustrated by way of example in the accompanying drawings a preferred embodiment of my improved engine. In said drawings.

Figure 1:
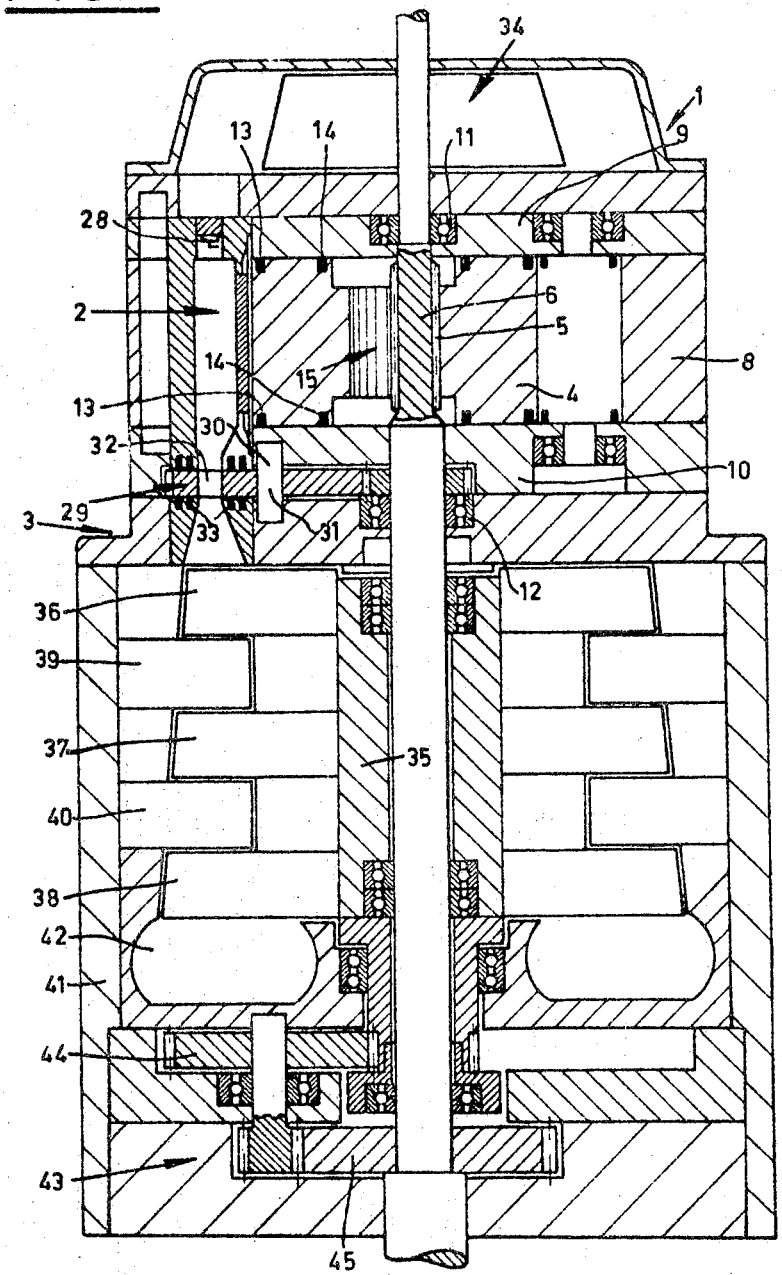
FIG. 1 is a longitudinal partly sectional view of said engine.

The engine illustrated cross-sectionally in FIG. 1 includes a compressor 1, the periphery of which is provided with three explosion chambers 2, and a turbine 3 arranged coaxially in alignment with said compressor.

Said compressor carries a piston 4 driven into rotation by a toothed wheel 5 keyed eccentrically to a driving shaft 6 extending through the lower wall of a chamber 7 formed in the compressor and inside which said piston is adapted to move. Said chamber 7 is defined by a lateral wall 8 and by two flanges 9 and 10 covering the side wall at either end and wherein the shaft 6 is revolvably carried in the bearings 11 and 12. The piston 4 is constituted by an elongated metal body having rounded ends with a semicircular outline while its thickness is slightly less than the height of the compressor chamber 7. Between said piston and the flanges 9 and 10 defining the chamber, are fitted annular packings 13 and 14 housed in corresponding grooves provided respectively in the upper and lower surfaces of the piston and subjected to the action of springs.

The central section of the piston is provided with an inwardly toothed cylindrical recess 15 toothed over a fraction of its inner surface. Said piston meshes through said teeth with the above-mentioned toothed wheel 5. The piston engages thus alternatingly through each end the inside of the three recesses of corresponding shapes 16, 17 and 18 formed in the lateral wall 8 of the chamber 7 while moving in contact with rollers 19, 20 and 21 arranged in corresponding housings of said wall 8. Said rollers are revolvably carried in bearings fitted on the flanges of the compressor chamber. Their fluidtightness is ensured by packings engaging their flat extreme surfaces and their cylindrical surfaces. Said rollers form both carriers for the piston engaging them permanently and means for fluidtightly closing the compression and suction chambers formed in succession during the rotation of the piston.

The piston is driven by the toothed wheel 5 eccentrically secured to the shaft 6 as already mentioned and it rotates thus eccentrically round the wheel which is also eccentric. This results in an orbital movement provided having an apogee with reference to the geometrical center of the chamber 7. Only the rollers 19, 20 and 21 are in contact with the piston. The speed-reducing ratio of the gears is equal to ½. However, since the shaft 6 and the piston 4 revolve in the same direction, said ratio is in practice equal to ¼, in other words, it is necessary for the shaft to execute four revolutions while the piston executes only one revolution. Since the latter operates alternatingly through each of its ends, the number of suction strokes and compressional strokes in the chambers formed in succession by the rotation of the piston and is equal to 6 for each revolution of the piston, in other words, there is one suction stroke and one compressional stroke for each ⅔ of a revolution of the shaft 6.

The size of the compressor is governed with a view to obtaining optimum working conditions by the following equations. The eccentricity of the pinion 5 with reference to the shaft 6 is approximately equal to $e=D/125$ D being the diameter of the datum circle of the pinion. The spacing A between the shaft 6 and the axis of the rollers 19, 20 and 21 is equal to $A=3.9722D$.

Between the radius R of the rollers 19, 20 and 21 and that r of the rounded ends of the piston, there exists the relationship $$R+r=A-D/2=3.4722D$$

In each of the semicylindrical recesses 16, 17 and 18 of the compressor chamber 7, between the rollers forming its limits, there is provided an admission valve 22, 23 or 24 respectively and an exhaust valve 25, 26 or 27 respectively. The admission valves are of a rotary type and open into the chamber 7 under the action of the suction movement of the piston 4 while they close during its compressional movement. They are controlled by gears, which are not illustrated, driven underneath the flange 10 of the compressor by the driving shaft. The exhaust valves are spring-urged and form valves adapted to separate the compressor chamber from the explosion chambers 2 located adjacent its periphery.

During the rotation of the piston, the compressional strokes follow each other in a direction opposed to the rotary direction of the shaft and of the piston.

Each recess 16, 17 and 18 being arranged at 120° from the other recesses, the apogee of the axis of the shaft 6 moves through 240° in an anticlockwise direction before it is obtained again with reference to the piston. The latter will have assumed a similar position but at 120° in the clockwise direction for instance. The apogee and the perigee follow exactly the operative cycle of the piston for each compression and for each suction stroke.

If said movement is described and followed for a single recess in the compression chamber, the position of the piston for a maximum suction passes from the vertical position to the horizontal position, in other words the piston will have executed 90° while the shaft has revolved by 360°. From the upper position occupied by the inner toothed opening for the vertical position occupied by the piston with reference to the drawing for which the contact point between said toothed periphery and the wheel on the main shaft lies at the perigee of the pinion with reference to the axis of the toothed opening, said toothed opening enters the lowermost position corresponding to the horizontal position of the piston, as illustrated, for which the contact point between the toothed opening and the wheel, corresponds to the apogee of the pinion with reference to the axis of the opening. This explains why for each radial recess in the chamber 7, it is necessary to execute one revolution of the main shaft for the suction stroke and a further revolution for the compressional stroke and consequently it is necessary to execute for the three radial recesses, for six suction strokes and six compressional strokes for four revolutions of the main shaft and one revolution of the piston.

Figure 2:
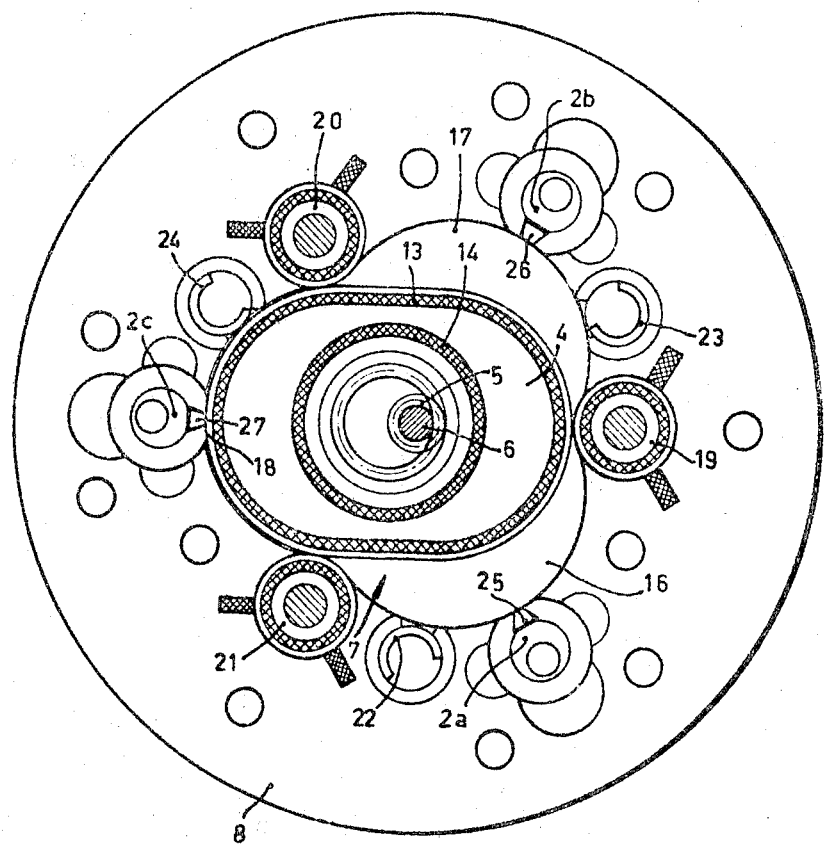
FIG. 2 is a cross-section on a larger scale through line II—II of FIG. 1.

Turning to FIG. 2, it is apparent that the explosion chambers 2a, 2b and 2c are located at the apices of each of the recesses in the compressor chamber. Said explosion chambers are cylindrical and carry at their upper ends each an ignition plug 28 and at their lower end, a valve 29 adapted to revolve round an axis 30. The valves are each constituted by a toothed wheel 31 controlled by the main shaft 6 and wherein are formed ports 32, which as they pass underneath the explosion chambers, connect the latter with the turbine. Packings 33 ensure fluidtightness of the valves.

The admission valves 22, 23 and 24 are fed by a centrifugal fan 34 driven by the driving shaft 6.

The turbine 3 is arranged coaxially with the main driving shaft 6 round the latter and is fitted on a hollow shaft 35. Said turbine includes three stages provided with blades respectively shown at 36, 37 and 38 and with deflectors 39 and 40. The blades are rigid with the hollow shaft 35 while the deflectors are secured to the frame 41 of the turbine, which is fitted in alignment with the compressor casing. Beyond the last stage of the turbine, a peripheral opening 42 collects the gases and ensures their exhaust.

The hollow shaft carrying the turbine controls, through the agency of a speed reducer 43, the driving shaft 6. The speed reducer is constituted by pinions 44 and 45. The stages of the turbine drive thus in unison the main driving shaft 6 which controls the centrifugal fan 34, the compressor 1, the admission valves 22, 23 and 24 and the rotary valves 29 at the lower ends of the explosion chambers 2a, 2b, 2c and also the propelling means or the energy-tappings feeding parts on the outside of the engine.

The operation of the engine will be readily understood from the following disclosure:

The compressor operates volumetrically in the three radial chambers arranged round its axis and the compressed mixture of air and fuel is fed into the three compression chambers and then into the three combustion chambers located along the periphery of the compressor in registry with the turbine blades. Since the compressor executes six suctions and six compressions for each revolution of the piston which means two suctions and two compressions for each chamber while four revolutions of the driving shaft are required for the obtention of one revolution of the piston, it will be readily understood that one revolution of the shaft corresponds to one suction while a further revolution corresponds to one compression, this being true for the successive chambers. Since the compressed gases are fed into an explosion chamber located outside the compression chamber, the explosion is obtained during the suction stroke.

The ignition is obtained as in a conventional engine by means of an ignition plug and it is performed at the end of the compression stroke. The gases expanded after explosion are fed onto the blades of the turbine. In order to make a proper use of the complete expansion force of the gases, the latter are deflected after passing through a first turbine into a second turbine and if required, into a third turbine, all these turbines being secured to a common shaft, until the speed of expansion of the gases drops down to a value equal to that of the peripheral speed of the turbine, in other words the energy of said gases is used entirely. Since a multiplicity of small explosions are obtained and energetic expansion of the burnt gases is uniformly applied to three points of the turbine, the result is the same as that obtained with the turbines used presently and which show however, the considerable drawback of being fed with a jet of ignited gas.

Since the waves produced by the explosion are supersonic, the use of the so-called blowing turbine now in favor is cut out. Another type of turbines, the so-called percussion turbines wherein the input and output of the gases are equal, is used to prevent the waves from forming echoes and impinging against each other at the input of the turbine, which risks producing vibrations in the latter.

The speed of the turbine is high. The shaft carrying the turbine is hollow and allows the compressor shaft to pass, which latter shaft forms also a transmission shaft. This latter shaft is driven through a speed reducer fitted at the end of the turbine shaft. If, as in the case of the turbine engines now in use, the speed reaches the value of say 4000 r.p.m., it is possible to use a speed reducing ratio of 1/10 with a view to obtaining 4000 r.p.m. on the transmission and compression shaft. As four revolutions of the compressor shaft are required for the execution of one revolution of the piston, the piston revolving at 1,000 r.p.m. produces 6,000 explosions per minute distributed in the three radial chambers, which means 2,000 explosions per chamber and per minute. This figure is substantially lower than the number of explosions per cylinder and per minute in conventional engines.

The rotary movement of said engines and the possibility of producing explosions over the turbine, lead to a large economy in fuel, to a reduced wear and to a cost price which is substantially lower than that of the engines now in use.

What I claim is:

1. An engine comprising a compressor casing forming a combustion chamber, a rotary piston revolvably carried in said combustoin chamber, including an elongated body the cross-section of which terminates with symmetrical semicircular ends and provided at its center with an inwardly toothed cylindrical recess extending perpendicularly to the plane of rotation of the piston, the inner wall of the casing surrounding the piston and forming three arcuate radial recesses lying at 120° from each other and the diameters of which match those of the semicircular ends of the cross-section of the piston body, said casing recesses being interconnected by short intermediate convex part cylindrical surfaces, the distance between the central point of the convex surface separating any two adjacent casing recesses from the medial generating line of the last recess being substantially equal to the length of the cross-section of the piston between the medial points of its semicircular ends, a shaft projecting into said casing and into the toothed recess of the piston, a toothed wheel eccentrically secured to said shaft and meshing with the teeth of said toothed recess to make the piston rotate while holding it constantly in contact with said cylindrical surfaces, and to close simultaneously at least two of the radial recesses in the casing, means feeding a combustible mixture into each radial recess upon closing thereof to ensure its subsequent compression, an explosion chamber extending outside and communicating with each radial recess of the casing, automatically operating first valves controlling the connection between each explosion chamber and the corresponding radial recess to fill the explosion chamber with the combustible mixture from said recess, second valves adapted to operate in alternation with the corresponding first valves, and a turbine into which said second valves open to feed said turbine with the burnt gases produced by the explosions.

2. An engine comprising a compressor casing forming one combustion chamber, a rotary piston revolvably carried in said combustion chamber, including an elongated body the cross-section of which terminates with symmetrical semicircular ends and provided at its center with an inwardly toothed cylindrical recess extending perpendicularly to the plane of rotation of the piston, the inner wall of the casing surrounding the piston and forming three arcuate radial recesses lying at 120° from each other and the diameters of which match those of the semicircular ends of the cross-section of the piston body, said casing recesses being interconnected by short intermediate convex part cylindrical surfaces, the distance between the central point of the convex surface separating any two adjacent casing recesses from the medial generating line of the last recess being substantially equally to the length of the cross-section of the piston between the medial points of its semicircular ends, a shaft projecting into said casing and into the toothed recess of the piston and adapted to act as a driving shaft, a toothed wheel eccentrically secured to said shaft and meshing with the teeth of said toothed recess to make the piston rotate while holding it constantly in contact with said cylindrical surfaces, and to close simultaneously at least two of the radial recesses in the casing, means feeding a combustible mixture into each radial recess upon closing thereof to ensure its subsequent compression, an explosion chamber extending outside and communicating with each radial recess of the casing, automatically operating first valves controlling the connection between each explosion chamber and the corresponding radial recess to fill the explosion chamber with the combustible mixture from said recess, second valves adapted to operate in alternation with the corresponding first valves, a turbine coaxial with and in alignment with the compressor casing, a hollow shaft carrying the turbine and surrounding the first-mentioned driving shaft of the compressor and a speed-reducing gear through which the hollow shaft controls the driving shaft.

References Cited by the Examiner

UNITED STATES PATENTS

| | | | |
|---|---|---|---|
| 1,277,626 | 9/1918 | Milke | 60—39.38 X |
| 2,928,242 | 3/1960 | Guenther | 60—39.39 |

FOREIGN PATENTS 1,278,136  10/1961  France.

MARK NEWMAN, *Primary Examiner.*

R. D. BLAKESLEE, *Assistant Examiner.*